US012657971B1

(12) United States Patent
Jarrett et al.

(10) Patent No.: US 12,657,971 B1
(45) Date of Patent: Jun. 16, 2026

(54) SECURE VEHICLE DATA SYSTEM

(71) Applicant: State Farm Mutual Automobile Insurance Company, Bloomington, IL (US)

(72) Inventors: Matt Jarrett, Normal, IL (US); John Bellegante, Murphy, TX (US); Sean Yeomans, Plano, TX (US); Arash Fan, Plano, TX (US); Shannan J. Smith, Mansfield, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 270 days.

(21) Appl. No.: 18/144,398

(22) Filed: May 8, 2023

(51) Int. Cl.
*G07C 5/08* (2006.01)
*G07C 5/00* (2006.01)

(52) U.S. Cl.
CPC ............. *G07C 5/085* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 10,891,694 | B1 * | 1/2021 | Leise | G08G 1/0112 |
| 2020/0023846 | A1 * | 1/2020 | Husain | H04W 4/44 |
| 2020/0380801 | A1 * | 12/2020 | Macneille | H04L 9/3236 |
| 2021/0264382 | A1 * | 8/2021 | Leise | G06Q 30/0645 |
| 2023/0098880 | A1 * | 3/2023 | Puchalski | G06F 8/60 701/533 |
| 2023/0394894 | A1 * | 12/2023 | Cain, Jr. | B60W 50/10 |
| 2024/0019262 | A1 * | 1/2024 | Harris | B60K 35/21 |
| 2024/0054563 | A1 * | 2/2024 | Shen | G06V 20/59 |
| 2024/0054823 | A1 * | 2/2024 | Lu | G07C 5/0808 |

FOREIGN PATENT DOCUMENTS

| | | | | |
|---|---|---|---|---|
| WO | WO-2014202435 | A1 * | 12/2014 | B60W 50/0097 |

* cited by examiner

*Primary Examiner* — Vivek D Koppikar
*Assistant Examiner* — David Ruben Pedersen
(74) *Attorney, Agent, or Firm* — Lee & Hayes, P.C.

(57) ABSTRACT

Described herein are systems and techniques to facilitate secure storage and efficient retrieval of vehicle data from a variety of sources that may be used to reconstruct various vehicular scenarios, such as a car accident. Vehicle data may be generated and/or collected by various systems, including vehicle-based systems, user devices (e.g., smartphones), and external systems (e.g., weather or mapping systems). This data may be aggregated by the disclosed systems into a data structure used to generate transaction data for a blockchain block that may then be stored in a blockchain for later use in vehicle scenario reconstructions.

20 Claims, 7 Drawing Sheets

SECURE VEHICLE DATA SYSTEM

BACKGROUND

Modern vehicles may be equipped with a variety of sensors and vehicle data systems. For example, modern vehicles may be equipped with cameras, radar, lidar, sonar, inertial sensors, location sensors (e.g., global positioning system (GPS) systems or devices), etc. Modern vehicles may also be equipped with systems to detect and generate data associated with vehicle performance, actions and/or states, such as speed, acceleration, braking (e.g., as deceleration), heading, etc. Other devices that may be traveling with a vehicle may also include sensors and/or other components that may be capable of determining and providing data that may reflect the operation of a vehicle. For example, a smartphone may include sensors that generate data indicating the smartphone's speed, acceleration, location, etc. Similarly, other devices, such as smartwatches, tablet computers, laptops, etc., may also include one or more components that may be used to determine such data.

While data from devices traveling with a vehicle may reflect the movement and/or operation of such a vehicle, it can be difficult to attribute or otherwise associate such data with a particular vehicle because such devices may not be explicitly associated with the vehicle and may not interact with systems related to the vehicle. Such vehicle-related data may be useful in certain situations involving a vehicle. For example, when a vehicle is involved in an accident, such data may be useful in determining the responsible driver(s) and/or the conditions leading to the accident. Such data may also be useful in determining the accuracy of a moving violation issued by traffic enforcement authorities. This type of data may also be useful in determining insurance policy adjustments and liability assessments. However, because such data may be difficult to correlate with a particular vehicle, user, and/or trip, it can be challenging to aggregate such data in a useful manner. The authenticity of vehicle data may be of particular importance, especially in regard to incidents involving the vehicle that have legal and/or financial implications. However, because there is no current unified system for aggregating data from a variety of sources for association with a particular vehicle, user, and/or trip, there is also no system for ensuring and verifying the authenticity of such data. The examples of the present disclosure are directed to overcoming these deficiencies and providing a unified system for aggregating and securing vehicle data.

SUMMARY

Techniques described herein implement distributed ledgers and similar systems to aggregate and store vehicle and trip data that can then be used to generate reconstructions of vehicle scenarios. These reconstructions can then be used for legal, financial, and/or insurance matters. Data from a variety of sources can be aggregated into blocks of data associated with particular time periods during a vehicle trip to form a distributed ledger that may represent vehicle data for a (e.g., complete) trip. Subsets of the data structures in the ledger may be used to reconstruct portions of the trip as needed.

For example, the techniques described herein may relate to receiving, by a processor, first vehicle data from a vehicle component configured at a vehicle and second vehicle data from a user device proximate to the vehicle. A trip identifier may be determined by the processor based at least in part on at least one of the first vehicle data and the second vehicle data. A vehicle data structure associated with the trip identifier may be determined by the processor and used to store at least a first subset of the first vehicle data and a second subset of the second vehicle data in the vehicle data structure. The processor may detect a distributed ledger data structure generation condition associated with the trip identifier and, in response, determine a distributed ledger based at least in part on the trip identifier, generate distributed ledger data content based at least in part on the vehicle data structure, generate a cryptographic hash of a first distributed ledger data structure of the distributed ledger, generate a second distributed ledger data structure based at least in part on the distributed ledger data content and the cryptographic hash, generate an updated distributed ledger based at least in part on the second distributed ledger data structure, and transmit the updated distributed ledger to a distributed ledger node.

In further examples, the techniques described herein may relate to non-transitory computer-readable medium comprising instructions that, when executed by one or more processors, cause the one or more processors to receive first vehicle data from a vehicle component and second vehicle data from a user device, determine a trip identifier based at least in part on at least one of the first vehicle data and the second vehicle data, and determine a trip blockchain based at least in part on the trip identifier. Transaction data may then be generated based at least in part on the first vehicle data and the second vehicle data and a cryptographic hash of a first blockchain block of the trip blockchain may be generated. A second blockchain block may be generated based at least in part on the transaction data and the cryptographic hash and integrated into the trip blockchain that may then be stored in a memory.

In additional examples, the techniques described herein may relate to a system that may include one or more processors and a non-transitory memory storing computer-executable instructions that, when executed, cause the one or more processors to receive first vehicle data from a first vehicle data system and second vehicle data from a second vehicle data system distinct that is from the first vehicle data system. A trip identifier may be determined based at least in part on at least one of the first vehicle data and the second vehicle data, along with a trip blockchain determined based at least in part on the trip identifier. Transaction data may be generated based at least in part on the first vehicle data and the second vehicle data, as well as a cryptographic hash of a first blockchain block of the trip blockchain. A second blockchain block may be generated based at least in part on the transaction data and the cryptographic hash and integrated into the trip blockchain that may be stored in a memory.

Further examples described herein may relate to a system for determining vehicle trip data that may include means for receiving first vehicle data from a first vehicle data system, means for receiving second vehicle data from a second vehicle data system, means for determining a trip identifier based at least in part on at least one of the first vehicle data and the second vehicle data, means for determining a trip blockchain based at least in part on the trip identifier, means for generating transaction data based at least in part on the first vehicle data and the second vehicle data, means for generating a cryptographic hash of a first blockchain block of the trip blockchain, means for generating a second blockchain block based at least in part on the transaction data and the cryptographic hash, and means for updating the trip blockchain based at least in part on the second blockchain block.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

Figure 1:
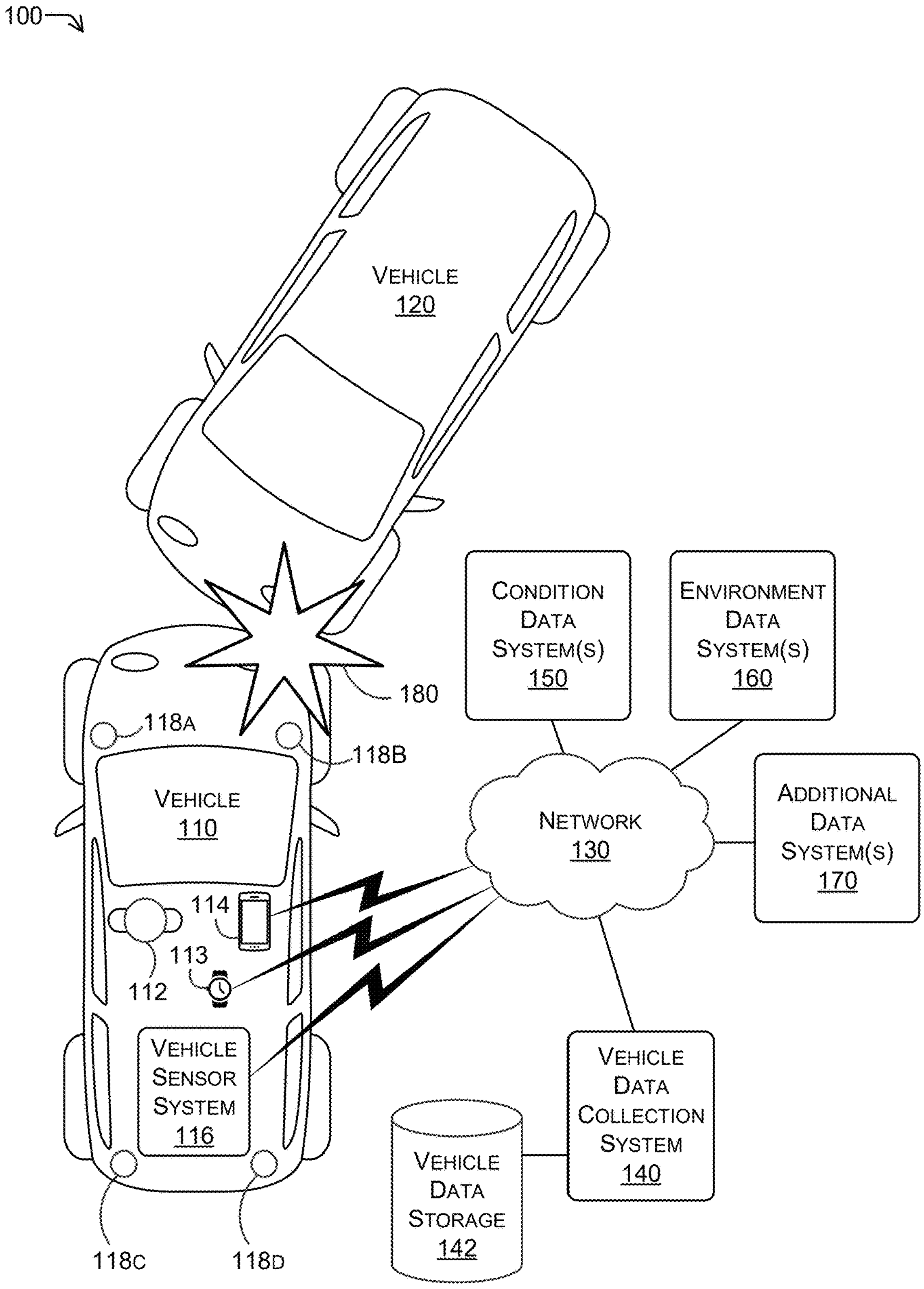
FIG. 1 illustrates an example environment in which vehicles may be traveling and in which a secure vehicle data system and the described techniques may be implemented.

FIG. 1 illustrates an environment 100 in which a secure vehicle data system may be implemented according to examples of the instant disclosure. As used herein "vehicle data" may include any data associated with a particular vehicle, including, but not limited to, vehicle condition, state, and/or operation data for a particular timeframe, a particular location, and/or particular path of travel. A "trip" may include a distance and/or duration of travel performed by a particular vehicle. A vehicle 110 and a vehicle 120 may each be traveling along a respective path during a particular timeframe within the environment 100. Each of the vehicles 110 and 120 may be any type of vehicle, such as a car, truck, motorcycle, boat, airplane, etc.

The vehicle 110 may be operated by driver 112 within the environment 100. The vehicle 110 may be configured with one or more sensors and/or vehicle data generation components. For example, the vehicle 110 may be configured with sensors 118*a-d*, each of which may represent one or more sensors of any type. For instance, each of sensors 118*a-d* may be one or more of a camera, lidar sensor, radar sensor, sonar sensor, inertial sensor (e.g., accelerometer, magnetometer, gyroscope, etc.), time-of-flight sensor, location sensor (e.g., GPS component), audio sensor, acoustic sensor, microphone, environment sensor (e.g., temperature sensor, humidity sensor, light sensor, pressure sensor, etc.), or any combination thereof. The vehicle 110 may be further configured with a vehicle sensor system 116 that may collect or otherwise receive sensor data from the sensors 118*a-d* for storage at the vehicle sensor system 116. The vehicle sensor system 116 may also include one or more sensors or combinations of sensors of any type as described herein. The vehicle sensor system 116 may further collect or receive data from one or more other vehicle components, such as a vehicle computer, speedometer, odometer, and/or any other component configured at the vehicle 110 that may generate data representing vehicle operation, state, and/or condition.

Configured at, or otherwise traveling with, the vehicle 110 may be one or more user devices that are distinct from vehicle components (e.g., that may be typically carried about by a human user, such as the driver 112). For example, a smartwatch 113 and/or a smartphone 114 may be present within the vehicle 110 (e.g., placed within the vehicle by the driver 112). Each of the devices 113 and 114 may also have one or more sensors or combinations of sensors of any type as described herein. Each of the devices 113 and 114 may collect and locally store the data generated by the respective sensors configured at such devices.

The vehicle sensor system 116 may transmit collected vehicle data originating at sensors and/or components configured at the vehicle 110 to a vehicle data collection system 140 via a network 130. This transmission may be a wireless communications transmission, using, for example, cellular communications and/or Wi-Fi. The network 130 may any one or more wireless and/or wired networks that may be configured to facilitate communications between computing devices.

The smartwatch 113 and/or the smartphone 114 may also transmit data generated by local components configured at such devices to the vehicle data collection system 140 via the network 130. In examples, the smartwatch 113 and/or the smartphone 114 may be configured with one or more applications ("apps") configured to facilitate vehicle data collection and transmission. For example, an app may be configured on smartphone 114 to determine (e.g., in response to movement detection, device location and/or change thereof, user activation of a control, etc.) that the smartphone 114 is within the vehicle 110 and/or accompanying the driver 112. Such an app may be configured to operate and/or collect data from one or more of the components configured at the smartphone 114 and transmit such data originating at sensors and/or components configured at the smartphone 114 to the vehicle data collection system 140 via the network 130. Such an app may be configured to automatically collect and/or transmit data for at least a portion of a trip during which the vehicle 110 may be operated by the driver 112. Alternatively or additionally, such an app may be configured to responsively collect and/or transmit data for at least a portion of a trip during which the vehicle 110 may be operated by the driver 112 based on activation of a control of the app.

The data transmissions originating at any of the vehicle sensor system 116 and the devices 113 and 114 may include identification data and/or trip portion data. For example, a transmission of vehicle data may include data identifying the vehicle 110 and/or the driver 112. Such a transmission may also include trip portion data that may indicate a timeframe associated with the data (e.g., beginning and end timestamps) and/or locations associated with the data (e.g., beginning and end locations). Any temporal and/or geographical portions of a trip may be represented in trip portion data. For example, vehicle data may be collected and transmitted every 10 seconds, 30 seconds, 1 minute, 5 minutes, etc. during a vehicle trip.

The vehicle data collection system 140 may be configured to obtain data associated with and/or based on vehicle data received from, e.g., the vehicle sensor system 116, smartwatch 113, and/or smartwatch 114. For example, the vehicle data collection system 140 may be configured to determine a location and/or a timeframe based on such vehicle data and query one or more condition data systems 150 via the network 130 for condition data for that location and/or time frame. For instance, the condition data system(s) 150 may include a weather service that the vehicle data collection system 140 may query for weather conditions at a location and timeframe associated with data received from or otherwise associated with the vehicle 110.

In examples, the vehicle data collection system 140 may also, or instead, be configured to query one or more environment data systems 160 via the network 130 for environment data for a location and/or timeframe associated with data received from or otherwise associated with the vehicle 110. For instance, the environment data system(s) 160 may include a mapping service that the vehicle data collection system 140 may query for detailed mapping data for a location associated with data received from or otherwise associated with the vehicle 110. Other types of data that may be associated with vehicle data for vehicle 110 may be obtained via the network 130 by the vehicle data collection system 140 from one or more other systems (represented in FIG. 1 as one or more additional data systems 170). The vehicle data collection system 140 may store collected vehicle data at a vehicle data storage 142 that may be any one or more data storage devices and/or components.

In various examples (e.g., as described in more detail herein), the vehicle data collection system 140 may generate one or more secure data structures associated with a portion of a trip in which to store vehicle data associated with that portion of the trip. For example, the vehicle data collection system 140 may generate a blockchain block containing data associated with a particular 10-second portion of a trip conducted by the vehicle 110. This data may be stored as transaction data within such a block. The data collection system 140 may integrate this block into a blockchain associated with the trip, the vehicle 110 and/or the driver 112. For example, subsequent blocks may integrate subsequent vehicle data as transaction data along with data associated with previous blocks (e.g., a cryptographic hash of one or more of such previous blocks, a cryptographic puzzle solution associated with one or more of such previous blocks). In other examples, either secure data structures and/or means of storing verifiable data may be used by the vehicle data collection system 140, such as one or more distributed ledger systems and/or one or more decentralized databases. In various examples, a trip data structure (e.g., blockchain, distributed ledger) may also, or instead, be stored in one or more nodes that may be any type of computing device or entity, such as one or more cloud-based services or systems.

In a non-limiting trip and vehicle data collection example, the vehicle 110 may be traveling in the environment 100 proximate to the vehicle 120. The vehicle 110 may be operating one or more of the sensors 118*a-d* and/or the vehicle sensor system 116 to collect various types of vehicle data during the operation of the vehicle 110 within the environment 100. The driver 112 may also be operating and/or have configured smartwatch 113 and/or smartphone 113 to collect various types of data that may be associated with the vehicle 110 and/or the driver 112 during the operation of the vehicle 110 within the environment 100. This data collected by the devices 113 and/or 114 and the vehicle sensor system 116 may be transmitted (e.g., automatically and/or periodically) to the vehicle data collection system 140 for processing (e.g., as described in more detail herein).

The vehicle data collection system 140 may also, or instead, acquire data from one or more of the systems 150, 160, and 170, for example, based on the data received from the devices 113 and/or 114 and the vehicle sensor system 116 and/or based on data generated from such received data. For example, the vehicle data collection system 140 may receive time and location data from one or more of the devices 113 and 114 and the vehicle sensor system 116. The vehicle data collection system 140 may then obtain weather condition data from the condition data system(s) 150 based on such time and location data. The vehicle data collection system 140 may also, or instead, obtain environment data (e.g., map data, terrain, data, topographical data, etc.) from the environment data system(s) 160 based on such time and location data. The vehicle data collection system 140 may also, or instead, obtain other types of data from the additional data system(s) 170 based on time and location data and/or any other data received from one or more of the devices 113 and 114 and the vehicle sensor system 116.

The vehicle data collection system 140 may generate one or more blocks containing such collected and/or determined data (e.g., as transaction data) and integrate the block(s) into a blockchain associated with the vehicle 110 and/or the driver 112 (e.g., associated with an insurance policy for the vehicle 110 held by the driver 112). The vehicle data collection system 140 may store the collected and/or determined data (e.g., as blockchain blocks) at the vehicle data storage 142 and/or at one or more devices and/or systems serving as blockchain nodes.

During the proximate travel of vehicles 110 and 120 within the environment 100, an incident may occur, such as a collision or impact, indicated in FIG. 1 as impact 180. The impact 180 may occur at an impact time and impact location. The devices 113 and 114 and the vehicle sensor system 116 may have been configured to collect data during a timeframe that includes the impact time. Therefore, the data collected may be used to reconstruct a scenario that may represent the environment 100 and operation of the vehicles 110 and 120 before, during, and after the impact time.

For example, the driver 112 may operate the smartphone 114 to retrieve the vehicle data associated with the impact 180 from the vehicle data collection system 140 and/or one or more other systems or devices that may have stored such data (e.g., the vehicle data storage 142, one or more blockchain nodes, etc.). The driver 112 may then operate the smartphone 114 to generate a (e.g., two-dimensional and/or three-dimensional) reconstruction of the impact 180 and the motion of the vehicles 110 and/or 120 during the impact 180 using this data. The driver 112 may also, or instead, use such data for other purposes, such as completing insurance forms and/or providing information for accident reports. Alternatively or additionally, one or more other parties may use the vehicle data associated with the impact 180 for various reconstructions and/or other purposes. For example, an insurance agent or adjuster may use such data to complete claims forms and/or determine fault, an attorney may use such data in litigation related to the impact 180, the police may use such data to assist in determining fault, a court may use such data to help determine liability, etc.

In various examples, an app may be configured on a device to retrieve and process stored vehicle data. For example, as described in more detail herein, an app may be configured on the smartphone 114 that may allow the driver 112 to determine a specific timeframe associated with the impact 180 and retrieve the stored vehicle data associated with this time and with the vehicle 110. The app may identify and verify (e.g., using blockchain block verification techniques) the data structure(s) containing the vehicle data associated with that timeframe and the vehicle 110. The app may further extract the vehicle data and use such data to generate a reconstruction of the events occurring temporally proximate to the impact 180 and/or present other data to the driver 112.

By collecting and storing vehicle data from a variety of sources in verifiable data structures, the systems and techniques described herein facilitate the collection of more complete and accurate vehicle data that may be used to reconstruct vehicle operations and incidents. The use of verifiable data structures, such as blockchain structures, for the storage of such data ensures that such data may be relied upon to provide accurate reconstructions of vehicle operations and incidents. For example, by storing vehicle data as transaction data in blockchain blocks, the possibility of manipulation of such data for illicit purposes is greatly reduced. Therefore, users may have increased confidence ion such data. Moreover, using blockchain and other distributed database techniques and systems to store vehicle data and reconstruct vehicle operations may improve the performance of such operations. For example, the disclosed systems and techniques provide a faster and more efficient way to retrieve and verify vehicle data that can then be used to reconstruct vehicle operations compared to traditional techniques of manually retrieving data from various potentially insecure sources to reconstruct scenarios involving a vehicle.

Figure 2:
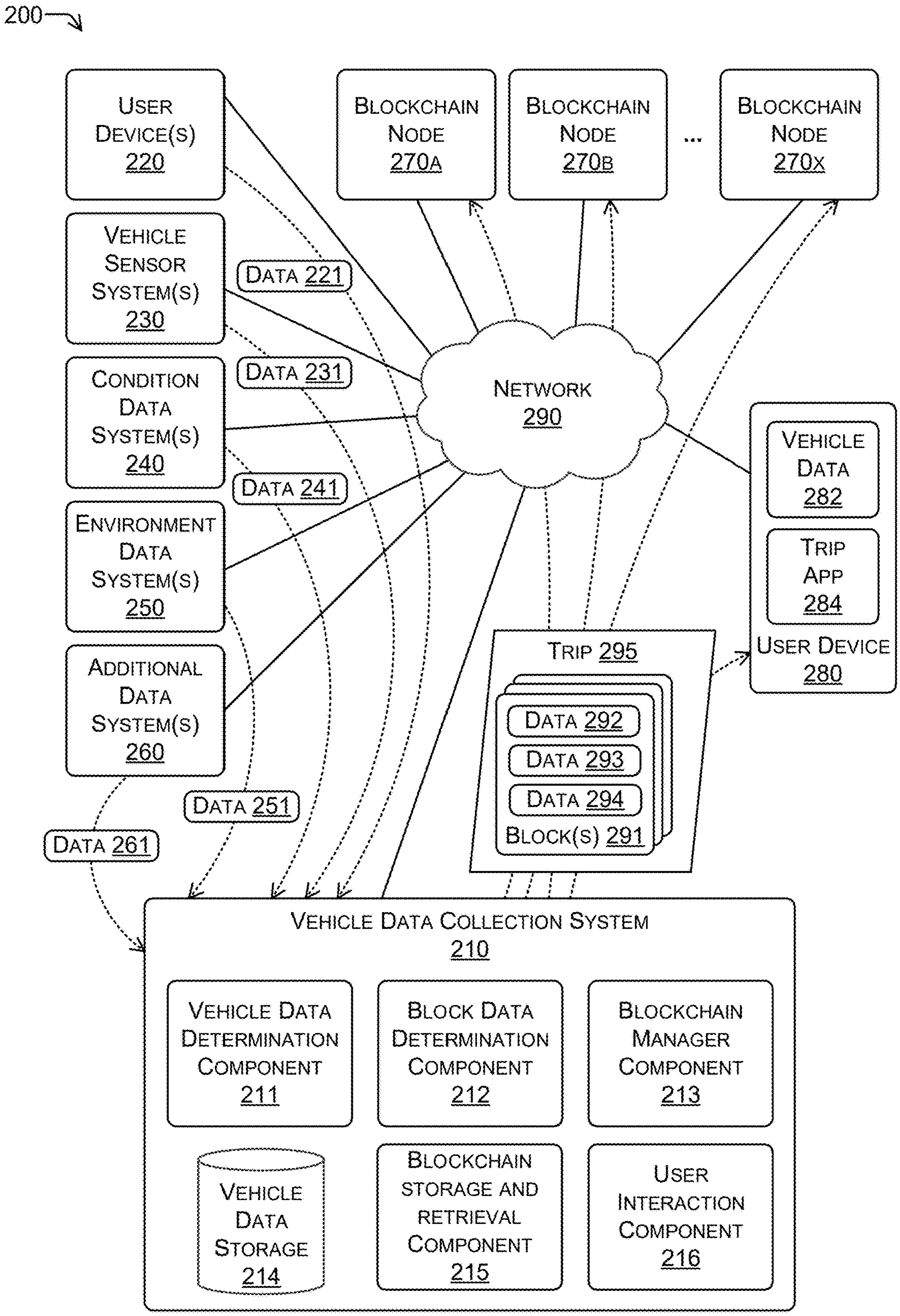
FIG. 2 schematically illustrates components of an example secure vehicle data system and various systems and components with which such a secure vehicle data system may interact according to the disclosed examples.

FIG. 2 illustrates a secure vehicle data system 200 according to examples of the instant disclosure. The secure vehicle data system 200 may include a vehicle collection system 210 that may interact with various systems and components to collect, generate, process, and store vehicle data. The vehicle collection system 210 may also provide vehicle data for vehicle scenario reconstructions and/or process vehicle data to generate vehicle scenario reconstructions.

In examples, the vehicle data collection system 210 may include a vehicle data determination component 211 that may be configured to determine and/or generate vehicle data. As noted herein, vehicle data may include any data associated with a particular vehicle at a particular time and/or location. For example, vehicle data may include velocity, acceleration, braking (e.g., as deceleration), heading, location, orientation, yaw, pitch, lateral force, longitudinal force, weather conditions, environmental conditions, and/or any other data that may represent a condition, state, and/or operation that may be associated with a vehicle. The vehicle data determination component 211 may store vehicle data at a vehicle data storage 214.

The vehicle data collection system 210 may receive vehicle data from a variety of systems. These systems may be configured to proactively or automatically transmit such data to the vehicle data collection system 210 (e.g., to the vehicle data determination component 211), for example, periodically and/or in response to detection of a condition. Alternatively or additionally, the vehicle data collection system 210 (e.g., the vehicle data determination component 211) may be configured to query such systems for vehicle data, for example, periodically and/or in response to detection of a condition.

For example, one or more user devices 220 may transmit vehicle data 221 to the vehicle data collection system 210 (e.g., to the vehicle data determination component 211) via the network 290, that may be any network or combinations of networks that may facilitate wired and/or wireless communications between computing devices. The data 221 may be any type of data that may be generated and/or collected by a non-vehicular user device (e.g., smartphone, smartwatch, laptop, tablet computer, etc.). For example, data 221 may include GPS data, accelerometer data, images, audio data, and/or video data, among other types of data.

One or more vehicle sensor systems 230 may transmit vehicle data 231 to the vehicle data collection system 210 (e.g., to the vehicle data determination component 211) via the network 290. The data 231 may be any type of data that may be generated and/or collected by a vehicle sensors and/or other vehicle components (e.g., lidar sensors, radar sensors, sonar sensors, cameras, microphones, accelerometers, GPS components, inertial sensors, wheel encoders, environment sensors, vehicle condition sensors (e.g., speedometer, odometer, tire pressure monitoring components, battery charge monitoring components, fuel level monitoring components, vehicle load monitoring components, etc.), etc. For example, data 231 may include speed data, acceleration data, GPS data, vehicle weight data, images, audio data, video data, lidar data, radar data, sonar data, among other types of data.

One or more condition data systems 240 may transmit vehicle data 241 to the vehicle data collection system 210 (e.g., to the vehicle data determination component 211) via the network 290. The data 241 may be any type of data that may represent conditions within an environment (e.g., at a particular location) at a particular time. For example, the data 241 may represent weather conditions for a particular time or timeframe, such as wind speed and/or direction, precipitation level, visibility, light level, sun position, etc. In examples, the vehicle data collection system 210 (e.g., the vehicle data determination component 211) may query the condition data system(s) 240 to request such data for a particular time and/or location based on time and/or location data received from one or more other systems. For example, the vehicle data collection system 210 may receive vehicle data from the vehicle sensor system(s) 230 that includes an indication of a particular time and a particular location associated with the received vehicle data. The vehicle data collection system 210 may then query the condition data system(s) 240 for condition data associated with that particular time and particular location.

One or more environment data systems 250 may transmit vehicle data 251 to the vehicle data collection system 210 (e.g., to the vehicle data determination component 211) via the network 290. The data 251 may be any type of data that may represent an environment (e.g., at a particular location) at a particular time. For example, the data 251 may represent mapping data, topographical data, construction zone data, traffic data, and/or any other data associated with the properties of an environment at a particular time. In examples, the vehicle data collection system 210 (e.g., the vehicle data determination component 211) may query the environment data system(s) 250 to request such data for a particular time and/or location based on time and/or location data received from one or more other systems. For example, the vehicle data collection system 210 may receive vehicle data from the vehicle sensor system(s) 230 that includes an indication of a particular time and a particular location associated with the received vehicle data. The vehicle data collection system 210 may then query the environment data system(s) 250 for traffic and mapping data associated with that particular time and particular location.

The vehicle data collection system 210 may interact with one or more other systems of any type to acquire any other types of data that may be included as vehicle data and/or used to generate vehicle data. For example, one or more additional data systems 260 may transmit vehicle data 261 to the vehicle data collection system 210 (e.g., to the vehicle data determination component 211) via the network 290. The data 261 may be any type of data that may be associated with a vehicle, driver, environment, conditions, etc. For example, the data 261 may include vehicle maintenance records, driver history, insurance data, traffic camera data, etc.

The vehicle data determination component 211 may use the collected vehicle data to determine and/or generate other vehicle data. For example, the vehicle data determination component 211 may use speed, acceleration, and location data to determine a path of travel for a vehicle over a timeframe that may be included as vehicle data. In another example, the vehicle data determination component 211 may use speed and location data for a vehicle combined with mapping and topographical data to determine a path of a vehicle (e.g., taking into account hills, curves, grades (slopes), etc.) that may be included as vehicle data.

The vehicle data determination component 211 may also associate vehicle data with appropriate identifiers and/or other information. For example, the vehicle data determination component 211 may determine a vehicle and a driver for vehicle data (e.g., based on a vehicle and/or a driver identified in received vehicle data such as data 221 or 231) and store the vehicle data in a data structure that also includes identifying data for the driver and/or vehicle. The vehicle data determination component 211 may also, or instead, determine other associated data, such as insurance provider and/or policy number, account number, vehicle identification number (VIN), license plate number, driver's license number, etc. that may be included in a data structure that also represented vehicle data.

In examples, the vehicle data determination component 211 may associate vehicle data with corresponding timeframes. For example, the vehicle data determination component 211 may store vehicle data associated with particular timeframes in a data structure associated with that timeframe. For instance, the vehicle data determination component 211 may receive or determine vehicle data at five-second increments of a trip. Vehicle data for each such increment may be stored in a single data structure along with any other associated data.

In examples, vehicle data and/or the data structures representative thereof may be associated with particular "trips." A trip may be the continuous operation of a vehicle from one geographical location to another. Alternatively, a trip may be the continuous operation of a vehicle from an initial starting of the vehicle to a shutdown of the vehicle. A trip may be assigned an identifier by the vehicle data determination component 211 and/or another system (e.g., the vehicle sensor system(s) 230, the user device(s) 220, etc.). For example, the vehicle data determination component 211 may receive vehicle data and recognize that such vehicle data has no corresponding trip identifier or characteristics that associate the vehicle data with an existing trip and may, in response, determine a new trip identifier to assign to the vehicle data and use with other vehicle data that may be associated with the same trip.

The vehicle data structure(s) determined by the vehicle data determination component 211 may be used by a block data determination component 212 to generate transaction data and/or other data that may be stored in a blockchain block or other distributed ledger data structure. For example, the block data determination component 212 may generate transaction data based on vehicle data represented in a data structure associated with a particular timeframe of a particular trip. This may include encoding, formatting, or otherwise generating block transaction data that represents at least a subset of the vehicle data and/or associated data (trip identifier, timeframe, driver identifier, vehicle identifier, etc.) represented in such a data structure. The block data determination component 212 may store block data at the vehicle data storage 214.

This transaction data may be provided to a blockchain manager component 213 that may generate a block representing the transaction data, a timestamp of block creation, and, if applicable, a representation (e.g., a cryptographic hash, a cryptographic puzzle solution) of one or more previous blocks. In examples, the blockchain manager component 213 may generate and maintain one blockchain for each individual trip. The blockchain manager component 213 may initiate a new blockchain with the first block associated with a particular trip and may generate subsequent blocks of the blockchain for the trip that each include a cryptographic hash of the previous block and/or a cryptographic puzzle solution associated with the previous block. For example, the blockchain manager component 213 may generate a blockchain for trip 295 that may include an identifier for the trip 295 and one or more blocks 291. Each of the blocks 291 may include vehicle data, such as data 292, 293, and 294. Each of the blocks 291 may also include representations of previous blocks, a timestamp, and/or other blockchain block data.

The blockchain manager component 213 may provide blocks and/or blockchains to the blockchain storage and retrieval component 215. The blockchain storage and retrieval component 215 may store such blocks and blockchains locally (e.g., at vehicle data storage 214) and/or may transmit such blocks and blockchains to other blockchain nodes. For example, the blockchain storage and retrieval component 215 may transmit new and updated blocks and blockchains (e.g., trip 295 blockchain) to one or more of blockchain nodes 270*a-x*.

The blockchain storage and retrieval component 215 may transmit blocks and/or blockchains in response to a query. For example, a user device 280 may request a blockchain associated with a particular trip or portion of a trip, as identified by vehicle data 282. This interaction may be facilitated by a vehicle data application, such as trip app 284 configured at the user device 280 that may interact with a user interaction component 216. A vehicle data application (may be referred to as "trip app" herein) may be an application configured at a user device that may facilitate user retrieval of vehicle data and associated data, presentation of such data, and/or reconstruction of scenarios with which a vehicle may be involved. The user interaction component 216 may determine a trip identifier or other means of identifying a particular blockchain and provide such data to the blockchain storage and retrieval component 215. The blockchain storage and retrieval component 215 may, in response, retrieve the blockchain (e.g., trip 295 blockchain) and/or one or more blocks associated therewith and provide the retrieved data to the user device 280.

In examples, the user interaction component 216 may determine that data for a portion of the trip 295 was requested by a user via user device 280. This portion may be indicated in the vehicle data 282. Upon retrieving the appropriate blockchain associated with the trip 295, the user interaction component 216 may determine the particular blocks associated with the requested trip portion and verify and extract the transaction data associated with those blocks. The user interaction component 216 may then provide that data to the user device 280. Alternatively or additionally, the user interaction component 216 may provide the trip 295 blockchain to the user device 280 that may perform verification and extraction of vehicle data locally. In examples, the user device 280 may request and receive trip 295 blockchain data from one or more of the other blockchain nodes 270*a-x*.

Using the trip 295 blockchain retrieved from the vehicle data collection system 210 via the user interaction component 216 (and/or from one or more of blockchain nodes 270*a-x*), the trip app 284 may generate a reconstruction of a scenario involving a vehicle and a timeframe associated with trip 295 blockchain. Alternatively or additionally, the trip app 284 may present some or all of the vehicle data and/or associated data represented in the trip 295 blockchain to a user (e.g., on a display). In examples, the trip app may determine a particular subset of the blocks of the trip 295 blockchain that correspond to a user-request portion of a trip from which to extract vehicle data and present to the user and/or reconstruct a scenario.

Figure 3A:
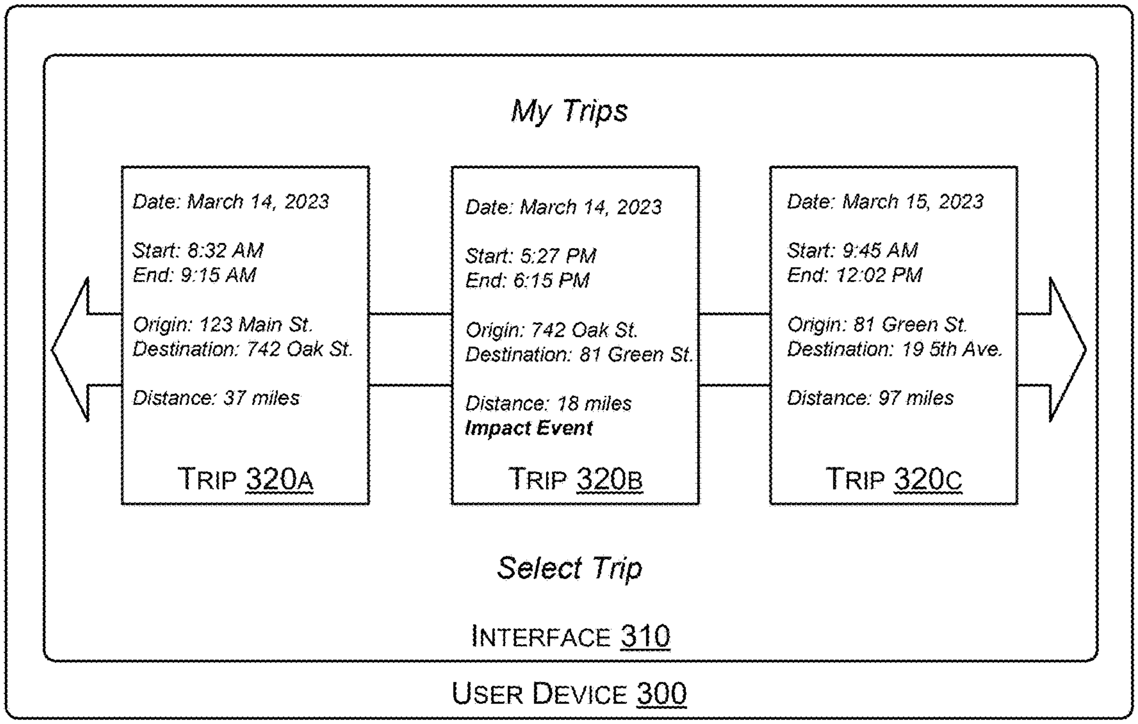
FIGS. 3A-3D illustrate an example user device and example interfaces that may be generated by the disclosed secure vehicle data system based on data generated using the techniques described herein.

FIG. 3A illustrates an example user interface 310 that may be presented on a user device 300. The interface 310 may be generated by a vehicle data application (e.g., a trip app such as trip app 284) that may be configured on the user device 300 for facilitating the retrieval and presentation of vehicle data associated with trips. The vehicle data application may also, or instead, be configured to generate one or more reconstructions of one or more trips based on vehicle data.

The vehicle data application may determine one or more data structures associated with one or more trips. In examples, a blockchain may be used to store data representing trip and vehicle data for a particular trip. The vehicle data application may be configured to identify trip blockchains that are associated with a particular user, driver, vehicle, account, etc. The vehicle data application may then generate an interface 310 representing the trips corresponding to the trip blockchains. For example, the vehicle data application may identify trips 320*a*, 320*b*, and 320*c* in interface elements as shown in this figure. The vehicle data application may generate the interface 310 to represent the trips 320*a*, 320*b*, and 320*c* along with an interface element presenting a summary of each such trip. As shown here, each trip summary may include a date, start time, and end time of the trip; an origin location and destination location of the trip; and a total distance of travel of the trip. Any other data that may be associated with the trip may also be represented in interface 310. In examples, one or more events may also be indicated in the trip summaries. For example, the trip 320*b* may include an indication that an impact event was detected. In examples, an impact event may be determined by vehicle sensor systems and/or based on vehicle data that may be correlated with impact, such as a sudden acceleration or deceleration, a sudden application of forces on a vehicle, inertial sensor data, accelerometer data, images, video, acoustic data, etc.

The interface 310 may include user-selectable controls that may cause the vehicle data application to generate one or more other interfaces and/or perform additional data processing. For example, the trip summaries 320*a*, 320*b*, and 320*c* presented in the interface 310 may each be a user-selectable control that allows a user to request more detail for a particular trip.

Figure 3B:
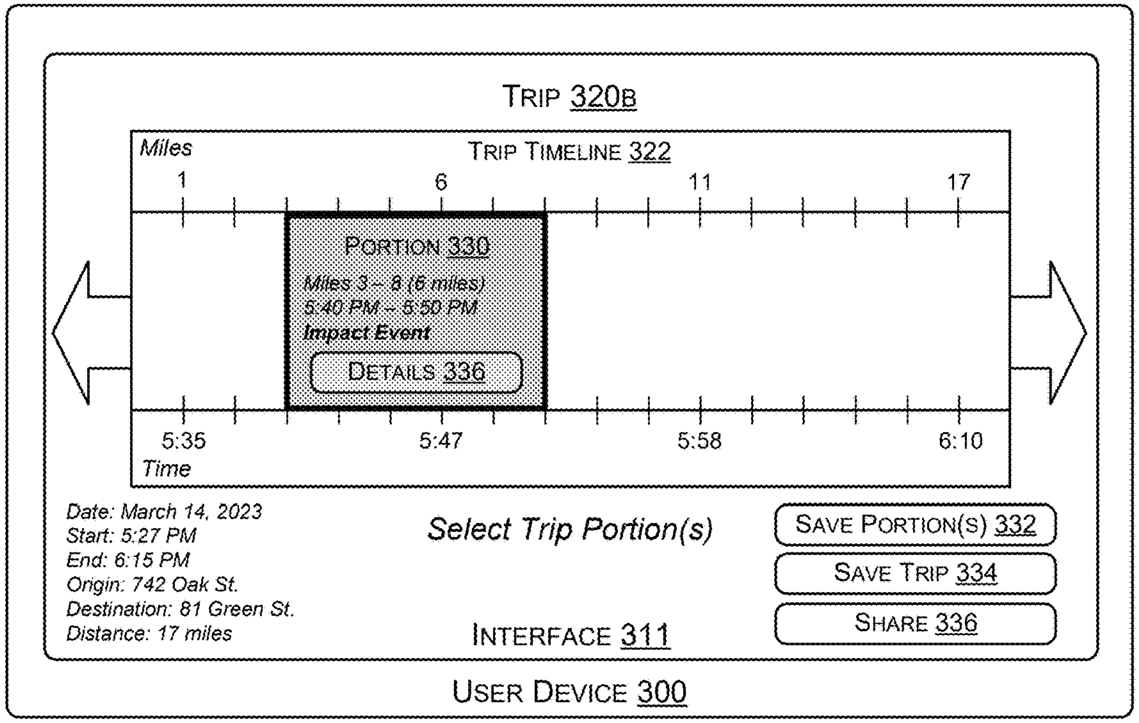

For example, a user may select the control presented as a summary of trip 320*b*. This may cause the vehicle data application to generate an interface with detailed information regarding the trip 320*b*. Referring now to FIG. 3B, details of the trip 320*b* may be presented in user interface 311 on user device 300. In examples, the trip 320*b* may be presented in an interface element generated in a timeline form that allows a user to select temporal portions of the trip. For example, the interface 311 may include a trip timeline 322 that includes indications of the time and the miles of the trip 320*b*. The interface 311 may also include other details about the trip 320*b* and one or more user-selectable controls.

The trip timeline 322 may be a control that allows the user to select portions of the trip. As shown in this figure, a user may have selected a portion 330 of the trip 320*b*. The details of the selected portion 330 may be presented in the interface 311 as shown here (e.g., the miles included in the selected portion, the timeframe of the selected portion, and/or whether there was an event (e.g., impact event) within the selected portion). The portion 330 may include a control 336 allowing a user to request additional details about the portion (discussed in regard to FIG. 3C).

The interface 311 may include one or more controls that allow the user to instruct the vehicle data application to take one or more actions. For example, a save portion(s) control 332 may cause the vehicle data application to save the selected portion 330 of the trip 320*b* in a distinct data structure and/or store instructions that, when executed by a computing device, cause the computing device to retrieve the data associated with the portion 330 (e.g., from a blockchain for trip 320*b*). In another example, a save trip control 334 may cause the vehicle data application to save the trip 320*b* in a distinct data structure and/or store instructions that, when executed by a computing device, cause the computing device to retrieve the data associated with the trip 320*b*. Another example control may be the share control 336 that may cause the vehicle data application to transmit the data associated with the trip 320*b* and/or the portion 330 to another device, system, or user (e.g., as an email attachment, upload to server or system, publish, etc.).

Figure 3C:
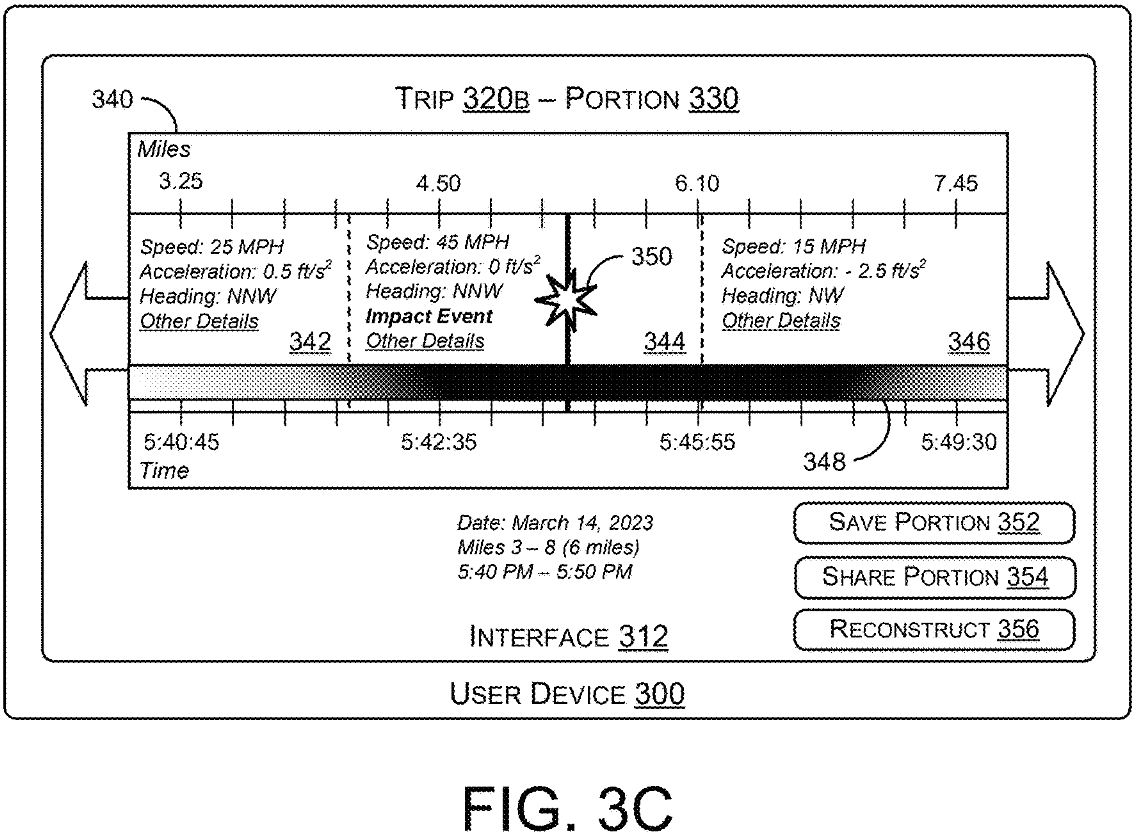

Returning to the details control 336, in response to detecting an activation of that control, the vehicle data system may generate an interface providing further details regarding the portion 330 of the trip 320*b*. Referring now to FIG. 3C, the vehicle data application executing on the user device 300 may generate a user interface 312 that includes an interface element representing a detailed timeline 340 representing details of the portion 330 of the trip 320*b*. The timeline 340 may include one or more sub-portions that may include representations of additional detailed data associated with that sub-portion. For example, sub-portion 342 may represent the initial portion of the portion 330 of the trip 320*b*, sub-portion 344 may represent the middle portion of the portion 330 of the trip 320*b*, and sub-portion 346 may represent the terminal portion of the portion 330 of the trip 320*b*. These portions may be determined based on changes to the corresponding vehicle data. For example, the sub-portion 342 may represent, and indicate as shown here, the acceleration of the vehicle during this sub-portion of the portion 330 of the trip 320*b*. The sub-portion 344 may represent, and indicate as shown here, the movement of the vehicle at a steady speed during this sub-portion of the portion 330 of the trip 320*b*. The sub-portion 346 may represent, and indicate as shown here, the deceleration of the vehicle during this sub-portion of the portion 330 of the trip 320*b*.

Other data may be indicated in the sub-portion interface elements 342, 344, and 346, such as speed, acceleration, and heading data, as well as indications of events such as impact event 350. There may be controls within the sub-portion interface elements 342, 344, and 346 that may cause the vehicle data application to provide additional details or take other actions.

The detailed timeline 340 may include graphical representations of various types of vehicle data. For example, a graphical representation of vehicle speed 348 may be presented along the timeline 340 along with the numerical representations of speed and other data that may be represented in the interface 312.

The interface 312 may include one or more controls that allow the user to instruct the vehicle data application to take one or more actions. For example, a save portion control 352 may cause the vehicle data application to save the selected portion 330 of the trip 320*b* in a distinct data structure and/or store instructions that, when executed by a computing device, cause the computing device to retrieve the data associated with the portion 330 (e.g., from a blockchain for trip 320*b*). In another example, a share portion control 354 may cause the vehicle data application to transmit the data associated with the portion 330 to another device, system, or user (e.g., as an email attachment, upload to server or system, publish, etc.). The interface 312 may further have a reconstruct control 356 that, when activated by a user, may cause the vehicle data application to generate a reconstruction of the portion 330 of the trip 320*b*.

Figure 3D:
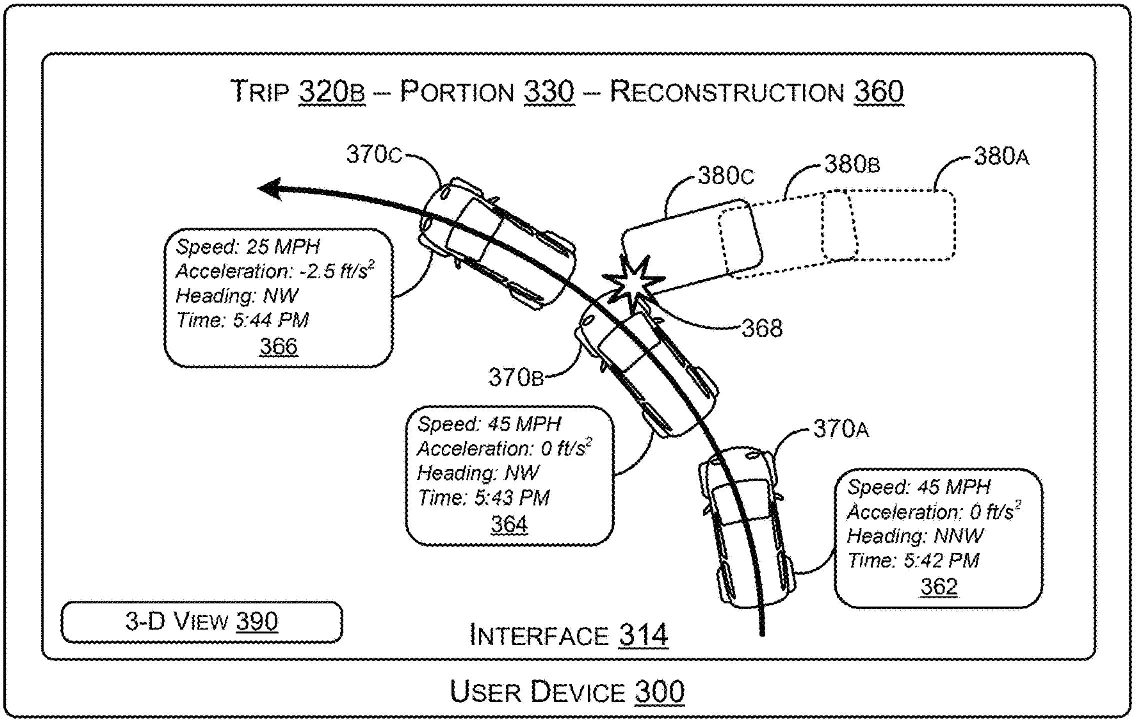

Referring now to FIG. 3D, the vehicle data application may generate a user interface 314 at the user device 300 in response to detecting the activation of the reconstruct control 356. The interface 314 may include an interface element presenting a reconstruction 360 of the portion 330 of the trip 320*b*. As shown here, the reconstruction 360 may include representations 370*a*, 370*b*, and 370*c* of a driver's vehicle at various locations over time (e.g., along a path of travel as represented by the corresponding vehicle data). The reconstruction 360 may also include representations 380*a*, 380*b*, and 380*c* of another vehicle traveling in the same environment over the same time as the driver's vehicle (e.g., determined from cameras, lidar, radar, or other sensors configured at the driver's vehicle; from traffic cameras; etc.).

Detailed information for various aspects of the reconstruction 360 may also be presented in the interface 314. For example, interface elements 362, 364, and 366 may indicate various types of vehicle data associated with the driver's vehicle when it is at the locations of the representations 370*a*, 370*b*, and 370*c*, respectively. An impact event 368 may also be reconstructed and indicated in the interface 314, for example, based on the data associated with the portion 330 of the trip 320*b*.

In examples, the reconstruction 360 may be two-dimensional or three-dimensional. For example, the interface 314 may include a view control 390 that allows a user to toggle between the two-dimensional reconstruction 360 shown in FIG. 3D and a three-dimensional reconstruction of the same scenario.

Figure 4:
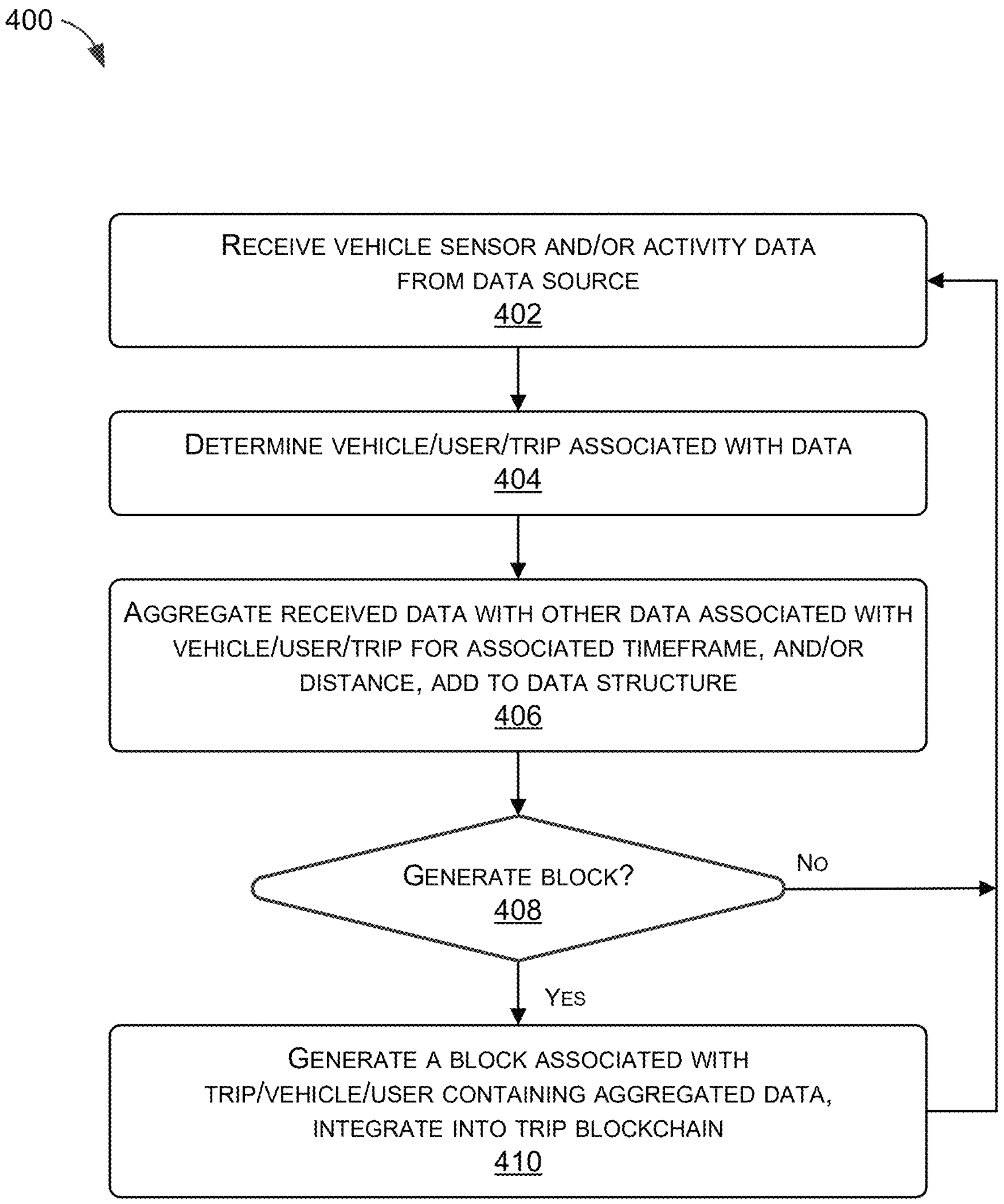
FIG. 4 is a pictorial flow diagram illustrating an example process for collecting, associating, aggregating, and generating blocks for vehicle data according to the examples described herein.

FIG. 4 is a pictorial flow diagram of an example process 400 for collecting and storing vehicle data for use by a secure vehicle data system. In examples, one or more operations of the process 400 may be implemented by a vehicle data collection system, such as by using one or more of the components and systems illustrated in FIGS. 1 and 2 and described above and/or by using one or more of the components and systems illustrated in FIG. 6 and described below. For example, one or more such components and systems can include those associated with the vehicle data collection system 140 illustrated in FIG. 1 and/or the vehicle data collection system 210 illustrated in FIG. 2. One or more such components and systems can also, or instead, include those associated with the computing device 600 illustrated in FIG. 6. In other examples, one or more operations of the process 400 may be performed by a combination of components described in regard to these systems and/or other systems. However, the process 400 is not limited to being performed by such components and systems, and the components and systems described herein are not limited to performing the operations of the process 400.

At operation 402, a vehicle data system may receive sensor data and/or other data associated with a vehicle from a data source. This data source may be any one or more sources of vehicle data and/or related data described herein, such as a vehicle sensor system, a user device (e.g., smartwatch, smartphone, tablet computer, laptop, etc.), a condition data system, an environment data system, and/or any other additional data system.

At operation 404, the vehicle data system may determine identifying information for the received data. For example, the vehicle data system may determine an identifier or other data included with the data received at operation 402 that indicates a particular user, vehicle, and/or trip with which the received data should be associated. Alternatively or additionally, the received data may include a blockchain or distributed ledger identifier that the vehicle data system may use to associate the received data with a particular trip, user, and/or vehicle. The vehicle data system may also, or instead, use the data received at operation 402 to determine an identifier. For example, the data received at operation 402 may include a username or vehicle identifier that the vehicle data system may use to determine a corresponding trip identifier or blockchain identifier.

At operation 406, the vehicle data system may aggregate the data received at operation 402 with other data pending integration into a trip blockchain, if applicable. For example, the vehicle data system may be configured to generate blocks having transaction data that represents vehicle data associated with a predetermined portion of time of a trip (e.g., 1 second, 5 seconds, 10 seconds, 1 minute, etc.). The vehicle data system may be configured to collect vehicle data for a vehicle data collection timeframe until that timeframe has expired, and then generate a block representing or otherwise using the data collected for that timeframe. The vehicle data system may use timestamps received with vehicle data to determine when the timeframe has been completed and/or may use a local clock. Therefore, at operation 406, the vehicle data system may determine whether there is a current data structure stored for the current timeframe of the trip determined to be associated with the data received at operation 402. If so, at operation 406 the vehicle data system may add the data received at operation 402 to the existing data structure for the current timeframe for that trip. If there is no data structure for the current timeframe and corresponding trip, the vehicle data system may generate a data structure at operation 406 and add the data received at operation 402 to that data structure.

At operation 408, the vehicle data system may determine whether to generate a block for a blockchain associated with the trip associated with the data received at operation 402. For example, if the vehicle data system determines that a vehicle data collection timeframe has expired, the vehicle data system may determine to generate a block for the data collected for that timeframe and may proceed to operation 410. If the vehicle data system determines at operation 408 that the current vehicle data collection timeframe has not expired, the vehicle data system may return to operation 402 to receive additional data for that timeframe.

At operation 410, the vehicle data system may generate a blockchain block for the trip associated with the data received at operation 402 and/or an ongoing trip. This block may include data representing the data collected for a current timeframe. For example, the vehicle data system may use a currently stored data structure for a (e.g., most recently completed) timeframe to generate transaction data for a blockchain block. The vehicle data system may then generate other data for this new block, such as a timestamp and a cryptographic hash of one or more previous blocks. Alternatively or additionally, the vehicle data system may generate a solution to a cryptographic puzzle associated with one or more previous blocks and include this solution in the new block. The new block may then be integrated into the blockchain and, in some examples, transmitted to one or more other blockchain nodes. If this is the first block in a blockchain, the block generated at operation 410 may be the initial block in a new blockchain for a particular trip. After integrating the new block into the trip blockchain, the process 400 may then return to operation 402 to collect additional data for subsequent timeframes of the trip.

Figure 5:
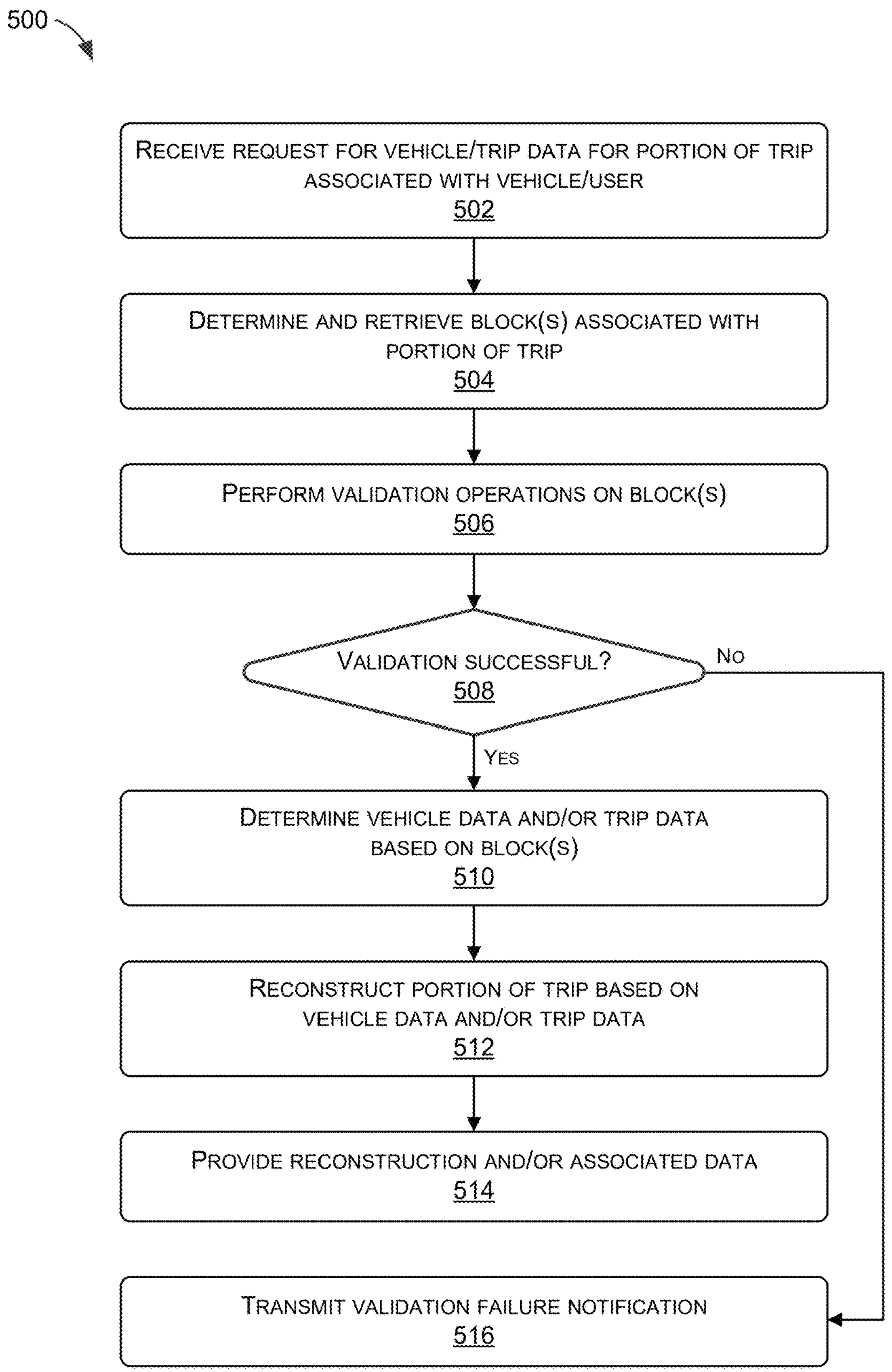
FIG. 5 is a pictorial flow diagram illustrating an example process for retrieving and verifying blocks of vehicle data for use in vehicle trip reconstructions according to the examples described herein.

FIG. 5 is a pictorial flow diagram of an example process 500 for retrieving vehicle data for use in scenario recreation in a secure vehicle data system. In examples, one or more operations of the process 500 may be implemented by a vehicle data collection system, such as by using one or more of the components and systems illustrated in FIGS. 1 and 2 and described above and/or by using one or more of the components and systems illustrated in FIG. 6 and described below. For example, one or more such components and systems can include those associated with the vehicle data collection system 140 illustrated in FIG. 1 and/or the vehicle data collection system 210 illustrated in FIG. 2. One or more such components and systems can also, or instead, include those associated with the computing device 600 illustrated in FIG. 6. In other examples, one or more operations of the process 500 may be performed by a combination of components described in regard to these systems and/or other systems. However, the process 500 is not limited to being performed by such components and systems, and the components and systems described herein are not limited to performing the operations of the process 500.

At operation 502, a vehicle data system may receive a request for vehicle data and/or trip data for a trip or a portion of a trip. For example, a user may select a portion of a trip on a trip app (see, e.g., FIG. 3B). The trip app may responsively generate a request for vehicle data associated with the selected trip portion. Alternatively or additionally, an event or condition may trigger a request for such data. For example, a vehicle component and/or an app configured on a user device traveling in a vehicle may detect an impact or other vehicular event. The device or component may responsively and/or automatically generate a request for vehicle data associated with a timeframe associated with that detected impact or event (e.g., a portion of a trip associated with a (e.g., most recent) timeframe.

At operation 504, the vehicle data system may determine the blockchain associated with the trip for which data was requested at operation 502. For example, the vehicle data system may determine a trip, user, vehicle, account, blockchain identifier, or other identifier that the system may use to identify a particular blockchain. Where the requested vehicle data is associated with a portion of a trip, the vehicle data system may determine a subset of blocks in a blockchain that is associated with that portion of the trip. For example, the vehicle data system may determine the blocks within a blockchain that have timestamps and/or other temporal data that corresponds to the timeframe of the portion of the trip for which vehicle data has been requested.

At operation 506, the vehicle data system may perform one or more validation and/or verification operations on the blocks determined at operation 504 to ensure that the blocks are authentic and unaltered. For example, the vehicle data system may verify a cryptographic key-pair for individual blocks to determine block authenticity and/or otherwise verify that a hash of a particular block in a subsequently generated block corresponds to the particular block. In other examples, the vehicle data system may determine a solution to a cryptographic puzzle. The system may then determine whether the solution corresponds to a cryptographic puzzle solution associated with a particular block and stored in a subsequently generated block. Alternatively or additionally, the vehicle data system may retrieve blocks from more than one blockchain node and perform one or more operations to compare the data within such blocks to determine authenticity. For example, the vehicle data system may perform operations to compare a first cryptographic hash representing a particular block (e.g., from a subsequently generated block) retrieved from a first blockchain node to a second cryptographic hash representing the same block retrieved from a second blockchain node. If the hashes do match or otherwise correspond, the system may determine that at least one of these blocks has been corrupted or otherwise altered, and therefore the data from either block is not trustworthy. If the hashes match, the system may determine that the blocks are trustworthy and therefore verified.

At operation 508, if the validation operation(s) 506 for one or more of the blocks determined at operation 504 fails, the process 500 may proceed to operation 516 where the vehicle data system may transmit or otherwise provide a notification to user (e.g., via a trip app) that the validation was not successful. The vehicle data system and/or the trip app may provide one or more particular error codes or other indications of the cause of the failure. The vehicle data system may also, or instead, transmit a notification to an administrative and/or security system to notify appropriate parties and/or users that the trip data has potentially been compromised.

At operation 508, if the validation operation(s) 506 for one or more of the blocks determined at operation 504 is successful, the process 500 may proceed to operation 510 where the vehicle data system may retrieve, generate, extract, or otherwise determine the vehicle data, trip data, and/or any other data that may be used to reconstruct the corresponding portion of the trip and/or generate data representing the portion of the trip for presentation to a user. For example, the vehicle data system may extract from the transaction data stored at the blocks obtained at operation 504 the vehicle and/or trip data necessary to generate a two-dimensional or three-dimensional reconstruction of the portion of the trip corresponding to the timeframe represented by such blocks.

At operation 512, the vehicle data system may use the data determined at operation 510 to generate a reconstruction of the portion of the trip associated with the request received at operation 502 and/or the blocks determined at operation 504. For example, the vehicle data system may generate a two-dimensional or three-dimensional reconstruction of the portion of the trip corresponding to the timeframe represented by such blocks (see, e.g., FIG. 3D). Alternatively and/or additionally, the vehicle data system may aggregate and format at least a subset of the data for presentation to a user. For example, the vehicle data system may generate a graphical user interface with various elements representing vehicle and/or trip data (see, e.g., FIG. 3C). At operation 514, the vehicle data system may present such reconstruction and/or vehicle/trip data to a user, for example, within a graphical user interface.

Figure 6:
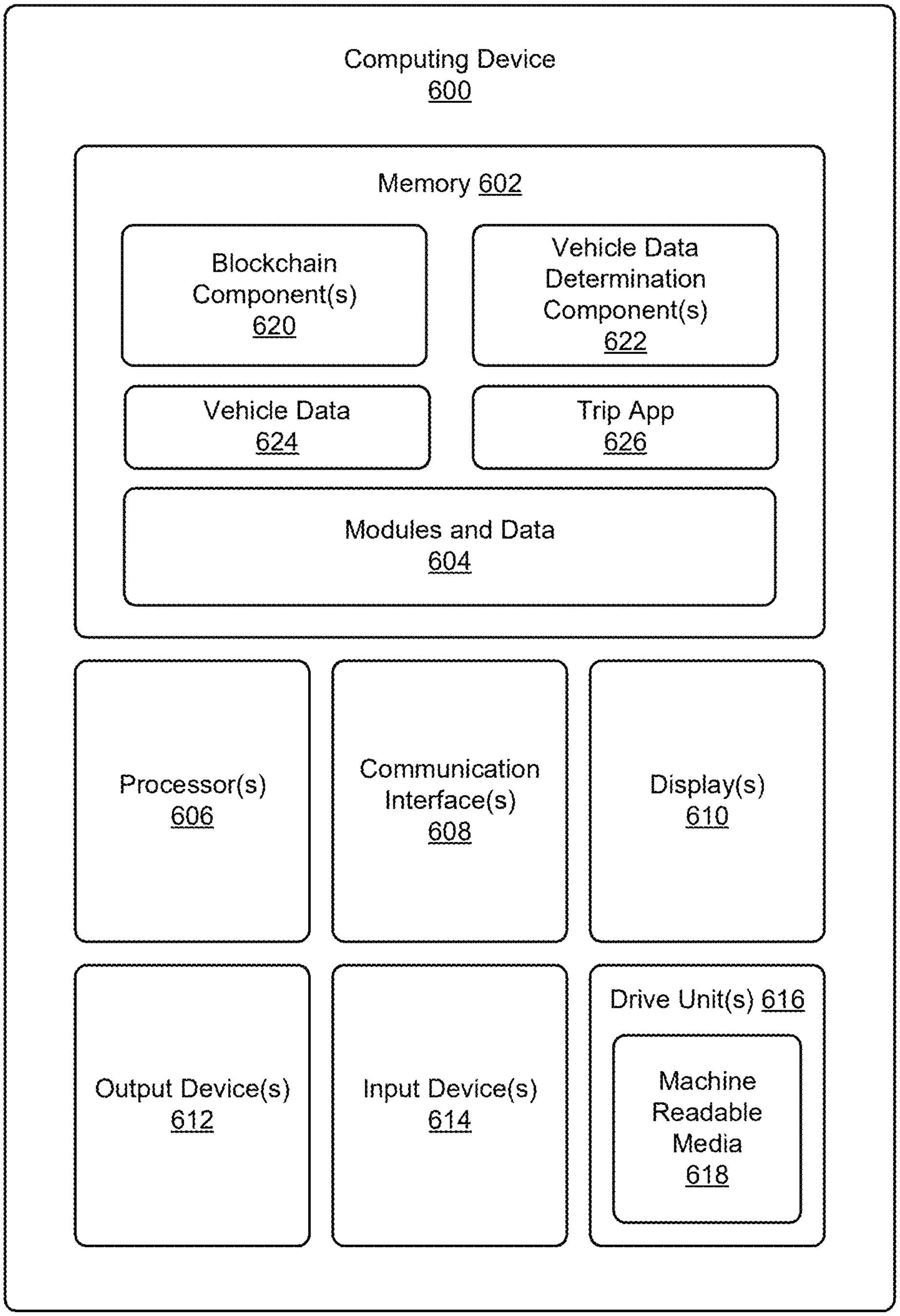
FIG. 6 shows an example system architecture for a computing device that may be used to implement the systems and architectures described herein.

FIG. 6 shows an example system architecture for a computing device 600 that may be implemented as (e.g., part of) any of the systems and devices described herein and/or may perform any of the operations and processes described herein. For example, the computing device 600 may represent any of the systems, devices, and components illustrated in FIGS. 1 and 2. Moreover, the computing device 600 may represent any system configured to generate any of the interfaces described in regard to FIGS. 3A-D and/or any other interface described herein. Furthermore, the computing device 600 may represent any system configured to implement any of the operations described in regard to FIGS. 4 and 5 and/or any other operation described herein. The computing device 600 may be a server, computer, mobile device (e.g., smartphone, smartwatch), vehicle component, or any other type of computing device that may execute any of the operations described herein. In some examples, operations as described herein may be distributed among and/or executed by multiple computing devices 600.

A computing device 600 can include memory 602. In various examples, the memory 602 can include system memory, which may be volatile (such as RAM), non-volatile (such as ROM, flash memory, etc.), or some combination of the two. The memory 602 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 600. Any such non-transitory computer-readable media may be part of the computing devices 600.

The memory 602 may include modules and data 604 needed to perform operations as described herein by one or more computing devices 600. Included with such modules and data 604 and/or also stored in the memory 602 may be one or more blockchain component 620, one or more vehicle data determination components 622, vehicle data 624, and/or one or more trip apps 626. The blockchain component(s) 620 may perform any one or more of the operations related to generating, managing, retrieving, storing, manipulating, verifying, and/or using any blocks and/or blockchains as described herein. The vehicle data determination component(s) 622 perform any one or more of the operations related to determining, generating, managing, retrieving, storing, manipulating, and/or using any vehicle data or related data (e.g., trip data, condition data, environment data, etc.) as described herein. The vehicle data 624 may be any vehicle data or related data (e.g., trip data, condition data, environment data, etc.) described that may be stored in a memory such as memory 602. The trip app 626 may be any application or combination of applications that may perform any of the trip app operations and/or vehicle data system operations described herein.

One or more computing devices 600 may also have processor(s) 606, communication interface(s) 608, display(s) 610, output device(s) 612, input device(s) 614, and/or drive unit(s) 616 that may include one or more machine-readable media 618.

In various examples, the processor(s) 606 can be a central processing unit (CPU), a graphics processing unit (GPU), both a CPU and a GPU, or any other type of processing unit. Each of the one or more processor(s) 606 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 606 may also be responsible for executing computer applications stored in the memory 602, which can be associated with common types of volatile (RAM) and/or nonvolatile (ROM) memory.

The communication interfaces 608 may include transceivers, modems, interfaces, antennas, telephone connections, and/or other components that can transmit and/or receive data over networks, telephone lines, or other connections.

The display(s) 610 can be any one or more of a liquid crystal display or any other type of display commonly used in computing devices. For example, the display(s) 610 may include a touch-sensitive display screen that may also act as an input device or keypad, such as for providing a soft-key keyboard, navigation buttons, and/or any other type of input.

The output device(s) 612 may include any sort of output devices known in the art, such as the display(s) 610, one or more speakers, a vibrating mechanism, and/or a tactile feedback mechanism. Output devices 612 may also include one or more ports for one or more peripheral devices, such as headphones, peripheral speakers, and/or a peripheral display.

The input device(s) 614 may include any sort of input devices known in the art. For example, input device(s) 614 may include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine-readable media 618 of drive unit(s) 616 may store one or more sets of instructions, such as software or firmware, that embodies any one or more of the methodologies or functions described herein. The instructions can also reside, completely or at least partially, within the memory 602, processor(s) 606, and/or communication interface(s) 608 during execution thereof by the one or more computing devices 600. The memory 602 and the processor(s) 606 may also constitute machine-readable media 618.

With the techniques described herein, a scenario involving a vehicle operating in an environment may be more easily and accurately reconstructed, such as for use in documenting an insurance claim and/or addressing legal issues surrounding an incident involving the vehicle. Furthermore, the data used to recreate such a scenario may be more readily and accurately determined, which may, for example, allow the use of such data and/or reconstructions based thereon in related insurance, legal, and financial matters.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

receiving, by a processor, first vehicle data from a vehicle component configured at a vehicle;

receiving, by the processor, second vehicle data from a user device proximate to the vehicle;

determining, by the processor, a trip identifier based at least in part on at least one of the first vehicle data or the second vehicle data;

determining, by the processor, a vehicle data structure associated with the trip identifier;

storing, by the processor and in the vehicle data structure, at least:

a first subset of the first vehicle data, and a second subset of the second vehicle data;

detecting, by the processor, a condition associated with the trip identifier that triggers generation of a distributed ledger data structure; and based at least in part on detecting the condition:

determining, by the processor, a distributed ledger based at least in part on the trip identifier;

determining, by the processor, a vehicle path, comprising first topographical data for a surface of the vehicle path, based at least in part on:

one or more of the first vehicle data or the second vehicle data, and mapping data for a location of the vehicle at a time of detection of the condition, the mapping data comprising second topographical data for a surface of the location;

updating, by the processor, the vehicle data structure to include the vehicle path;

generating, by the processor, distributed ledger data content based at least in part on the updated vehicle data structure;

generating, by the processor, a cryptographic hash of a first distributed ledger data structure of the distributed ledger;

generating, by the processor, a second distributed ledger data structure based at least in part on the distributed ledger data content and the cryptographic hash;

generating, by the processor, an updated distributed ledger based at least in part on the second distributed ledger data structure;

transmitting, by the processor, the updated distributed ledger to a distributed ledger node;

receiving, by the processor, a request to generate a reconstruction of a portion of a trip associated with the trip identifier;

identifying, by the processor, the updated distributed ledger based at least in part on the trip identifier;

determining, by the processor, based at least in part on the updated distributed ledger, reconstruction data associated with at least one of the first vehicle data or the second vehicle data, the reconstruction data comprising three-dimensional data based at least in part on the first topographical data; and generating, by the processor, the reconstruction based at least in part on the reconstruction data.

2. The method of claim 1, further comprising:

receiving condition data associated with environmental conditions at the vehicle from a condition data system remote from a geographical location of the vehicle; and storing environmental condition data determined based on the condition data in the vehicle data structure.

3. The method of claim 2, wherein the environmental condition data comprises data associated with one or more of a weather condition or a visibility condition.

4. The method of claim 1, further comprising:

receiving environment data associated with an environment at the vehicle from an environment data system remote from a geographical location of the vehicle; and storing at least a third subset of the environment data in the vehicle data structure.

5. The method of claim 4, wherein the environment data comprises data associated with one or more of a mapping of the geographical location, third topographical data associated with the geographical location, construction zone data associated with the geographical location, or traffic data associated with the geographical location.

6. The method of claim 1, wherein the first topographical data comprises data representing one or more of a hill, a grade, or a slope on the vehicle path.

7. The method of claim 1, wherein the vehicle path further comprises one or more of acceleration data for the vehicle, velocity data for the vehicle, or braking data for the vehicle.

8. The method of claim 1, wherein:

the request comprises a timeframe; and the method further comprises:

determining one or more distributed ledger data structures in the updated distributed ledger associated with the timeframe;

extracting second distributed ledger data content from the one or more distributed ledger data structures; and generating the reconstruction further based at least in part on the second distributed ledger data content.

9. The method of claim 1, wherein the request is generated in response to detected vehicle motion.

10. A non-transitory computer-readable medium comprising instructions that, when executed by one or more processors, cause the one or more processors to:

receive first vehicle data from a vehicle component; receive second vehicle data from a user device;

determine a trip identifier based at least in part on at least one of the first vehicle data or the second vehicle data;

determine a trip blockchain based at least in part on the trip identifier;

determining a vehicle path comprising first topographical data for the vehicle path based at least in part on:

one or more of the first vehicle data or the second vehicle data, and mapping data for a location of a vehicle associated with the one or more of the first vehicle data or the second vehicle data, the mapping data comprising second topographical data for the location;

generate transaction data based at least in part on the vehicle path, the first vehicle data, and the second vehicle data;

generate a cryptographic hash of a first blockchain block of the trip blockchain;

generate a second blockchain block based at least in part on the transaction data and the cryptographic hash;

integrate the second blockchain block into the trip blockchain;

store the trip blockchain in a memory;

receive a request to generate a reconstruction of a portion of a trip associated with the trip identifier;

identify the second blockchain block based at least in part on the trip identifier;

determine, based at least in part on the second blockchain block, reconstruction data associated with at least one of the first vehicle data or the second vehicle data, the reconstruction data comprising three-dimensional data based at least in part on the first topographical data; and generate the reconstruction based at least in part on the reconstruction data.

11. The non-transitory computer-readable medium of claim 10, wherein the second vehicle data comprises one or more of:

a user device location;

a time of generation of the second vehicle data;

a heading;

a speed;

an acceleration;

an image;

video data; or audio data.

12. The non-transitory computer-readable medium of claim 10, wherein the first vehicle data comprises vehicle sensor data generated by one or more of:

a camera;

a lidar sensor;

a radar sensor;

a sonar sensor;

an inertial sensor;

a time-of-flight sensor;

a location sensor;

an audio sensor; or an environment sensor.

13. The non-transitory computer-readable medium of claim 10, wherein the first topographical data comprises data representing one or more of a hill, a grade, or a slope on the vehicle path.

14. The non-transitory computer-readable medium of claim 10, wherein:

the request comprises a timeframe; and the non-transitory computer-readable medium further comprises instructions that, when executed by the one or more processors, cause the one or more processors to:

determine one or more blockchain blocks in the trip blockchain associated with the timeframe;

extract second transaction data from the one or more blockchain blocks; and generate the reconstruction further based at least in part on the second transaction data.

15. The non-transitory computer-readable medium of claim 10, wherein the request is generated in response to a detected vehicle impact.

16. A system comprising:

one or more processors; and a non-transitory memory storing computer-executable instructions that, when executed, cause the one or more processors to:

receive first vehicle data from a first vehicle data system;

receive second vehicle data from a second vehicle data system distinct from the first vehicle data system;

determine a trip identifier based at least in part on at least one of the first vehicle data or the second vehicle data;

determine a trip blockchain based at least in part on the trip identifier;

determining a vehicle path comprising first topographical data for the vehicle path based at least in part on:

one or more of the first vehicle data or the second vehicle data, and mapping data for a location of a vehicle associated with the one or more of the first vehicle data or the second vehicle data, the mapping data comprising second topographical data for the location;

generate transaction data based at least in part on the vehicle path, the first vehicle data, and the second vehicle data;

generate a cryptographic hash of a first blockchain block of the trip blockchain;

generate a second blockchain block based at least in part on the transaction data and the cryptographic hash;

integrate the second blockchain block into the trip blockchain;

store the trip blockchain in a memory;

receive a request to generate a reconstruction of a portion of a trip associated with the trip identifier;

identify the second blockchain block based at least in part on the trip identifier;

determine, based at least in part on the second blockchain block, reconstruction data associated with at least one of the first vehicle data or the second vehicle data, the reconstruction data comprising three-dimensional data based at least in part on the first topographical data; and generate the reconstruction based at least in part on the reconstruction data.

17. The system of claim 16, wherein the non-transitory memory further stores computer-executable instructions that, when executed, cause the one or more processors to transmit the trip blockchain comprising the second blockchain block to one or more blockchain nodes.

18. The system of claim 16, wherein:

the non-transitory memory further stores computer-executable instructions that, when executed, cause the one or more processors to detect a blockchain block generation condition; and generating the second blockchain block is further based at least in part on detecting the blockchain block generation condition.

19. The system of claim 18, wherein the blockchain block generation condition comprises one of a timeframe expiration detection or a vehicle impact detection.

20. A system for determining vehicle trip data, the system comprising:

means for receive first vehicle data from a first vehicle data system;

means for receiving second vehicle data from a second vehicle data system;

means for determining a trip identifier based at least in part on at least one of the first vehicle data or the second vehicle data;

means for determining a trip blockchain based at least in part on the trip identifier;

means for determining a vehicle path comprising first topographical data for the vehicle path based at least in part on:

one or more of the first vehicle data or the second vehicle data, and mapping data for a location of a vehicle associated with the one or more of the first vehicle data or the second vehicle data, the mapping data comprising second topographical data for the location;

means for generating transaction data based at least in part on the vehicle path, the first vehicle data, and the second vehicle data;

means for generating a cryptographic hash of a first blockchain block of the trip blockchain;

means for generating a second blockchain block based at least in part on the transaction data and the cryptographic hash;

means for updating the trip blockchain based at least in part on the second blockchain block;

means for receiving a request to generate a reconstruction of a portion of a trip associated with the trip identifier;

means for identifying the second blockchain block based at least in part on the trip identifier;

means for determining, based at least in part on the second blockchain block, reconstruction data associated with at least one of the first vehicle data or the second vehicle data, the reconstruction data comprising three-dimensional data based at least in part on the first topographical data; and means for generating the reconstruction based at least in part on the reconstruction data.

* * * * *